US009041513B1

(12) United States Patent  
Pai et al.

(10) Patent No.: US 9,041,513 B1
(45) Date of Patent: May 26, 2015

(54) SYSTEM AND METHOD FOR COMMUNICATING WITH SENSORS/LOGGERS IN INTEGRATED RADIO FREQUENCY IDENTIFICATION (RFID) TAGS

(75) Inventors: Srinath B. Pai, Bangalore (IN); K. Krishna Moorthy, Bangalore (IN)

(73) Assignee: NATIONAL SEMICONDUCTOR CORPORATION, Santa Clara, CA (US)

( * ) Notice: Subject to any disclaimer, the term of this patent is extended or adjusted under 35 U.S.C. 154(b) by 2892 days.

(21) Appl. No.: 11/242,631

(22) Filed: Oct. 3, 2005

(51) Int. Cl.
*H04Q 5/22* (2006.01)
*G08B 5/22* (2006.01)
*G06F 3/00* (2006.01)
*G06F 13/00* (2006.01)
*H04B 1/38* (2006.01)
*G06F 11/07* (2006.01)

(52) U.S. Cl.
CPC .................................. *G06F 11/0736* (2013.01)

(58) Field of Classification Search
USPC ............ 340/10.1, 10.51, 825.22, 572.1, 10.4, 340/10.41, 10.52, 825.69, 572.3; 235/385; 714/30; 382/100
See application file for complete search history.

(56) References Cited

U.S. PATENT DOCUMENTS

| | | | | | |
|---|---|---|---|---|---|
| 3,731,280 | A | * | 5/1973 | Shevlin | 712/245 |
| 3,820,085 | A | * | 6/1974 | Zelinski | 712/220 |
| 4,099,231 | A | * | 7/1978 | Kotok et al. | 711/168 |
| 4,797,853 | A | * | 1/1989 | Savage et al. | 710/22 |
| 4,924,427 | A | * | 5/1990 | Savage et al. | 710/26 |
| 5,517,194 | A | * | 5/1996 | Carroll et al. | 340/10.34 |
| 5,761,726 | A | * | 6/1998 | Guttag et al. | 711/147 |
| 6,009,206 | A | * | 12/1999 | Acharya | 382/251 |
| 6,058,374 | A | * | 5/2000 | Guthrie et al. | 705/28 |
| 6,085,325 | A | * | 7/2000 | Jackson et al. | 713/300 |
| 6,216,251 | B1 | * | 4/2001 | McGinn | 714/800 |
| 6,677,852 | B1 | * | 1/2004 | Landt | 340/10.1 |
| 2001/0005882 | A1 | * | 6/2001 | Ekner | 712/244 |
| 2003/0088626 | A1 | * | 5/2003 | Gupta et al. | 709/206 |
| 2004/0201457 | A1 | * | 10/2004 | O'Toole et al. | 340/10.33 |
| 2004/0243744 | A1 | * | 12/2004 | Smith et al. | 710/52 |
| 2004/0266480 | A1 | * | 12/2004 | Hjelt et al. | 455/558 |
| 2005/0263591 | A1 | * | 12/2005 | Smith | 235/385 |
| 2006/0029250 | A1 | * | 2/2006 | Karaki | 382/100 |
| 2006/0059387 | A1 | * | 3/2006 | Swoboda et al. | 714/30 |
| 2006/0161828 | A1 | * | 7/2006 | Lin | 714/738 |
| 2006/0279412 | A1 | * | 12/2006 | Holland et al. | 340/10.51 |

\* cited by examiner

*Primary Examiner* — Fekadeselassie Girma
(74) *Attorney, Agent, or Firm* — Andrew Viger; Frederick J. Telecky, Jr.

(57) ABSTRACT

A system and method is disclosed for communicating with sensors/loggers in integrated radio frequency identification (RFID) tags. An RFID reader uses a Communicate With Data Logger Command to communicate with a data logger in an RFID tag. The RFID reader performs data access processes using an Index Register and a Data Register of the RFID tag. The RFID reader selects one of (1) Index Read access (2) Index Write access (3) Data Write access (4) Data Read access with parity and (5) Data Read access with cyclic redundancy check (CRC). The RFID tag performs the requested data access and then performs an error detection process.

21 Claims, 7 Drawing Sheets

COMMUNICATE WITH DATA LOGGER COMMAND

CONTROL BITS FOR COMMUNICATE WITH DATA LOGGER COMMAND

SYSTEM AND METHOD FOR COMMUNICATING WITH SENSORS/LOGGERS IN INTEGRATED RADIO FREQUENCY IDENTIFICATION (RFID) TAGS

TECHNICAL FIELD OF THE INVENTION

The present invention is generally directed to manufacturing technology for semiconductor devices and, in particular, to a system and method for communicating with sensors/loggers in integrated radio frequency identification (RFID) tags.

BACKGROUND OF THE INVENTION

Radio frequency identification (RFID) technology comprises a non-contact automatic identification system. RFID technology provides an automatic method for efficiently collecting product, place, time or transaction data without human intervention.

As shown in FIG. 1, an RFID system 100 generally comprises a host computer system 110 and at least one reader unit 120. The reader unit 120 may communicate with the host computer system 110 via wired or wireless communication. The reader unit 120 uses an antenna to transmit radio energy to interrogate a responder such as a radio frequency identification (RFID) tag. The RFID system 100 shown in FIG. 1 comprises a first RFID tag 130, a second RFID tag 140, and an Nth RFID tag 150.

An RFID tag (e.g., RFID tag 130) does not have an on-chip battery, but rather receives its energy from the incoming RF signal from the reader unit 120. The RFID tag 130 uses the energy from the incoming RF signal to extract the data that is stored in the chip of the RFID tag 130 and send the data back to the reader unit 120. The reader unit 120 can then send the data from the RFID tag 130 to the host computer system 110 for further processing.

An RFID system usually comprises at least one reader unit and a plurality of RFID tags. An RFID system can be used to identify persons or objects that have an RFID tag and that are located within the reading range of reader unit. The reader unit uses a pre-defined RFID communication protocol to communicate with all of the RFID tags that are located within range.

In one embodiment of an RFID system the reader unit transmits data to an RFID tag with an amplitude modulated (AM) radio frequency (RF) signal having a frequency in the range from nine hundred MegaHertz (900 MHz) to two and fourth tenths GigaHertz (2.4 GHz). In the RFID tag a demodulator recovers the baseband signal from the incoming RF signal. A demodulator in an RFID tag should be able to recover the baseband signal of an RF amplitude that has sufficient power to power the chip of the RFID tag.

The demodulator in an RFID tag should also be able to decode amplitude shift keying (ASK) demodulation depths from twenty percent (20%) to one hundred percent (100%). The demodulator in an RFID tag should also be able to receive data at data rates that range from sixteen thousand bits per second (16 Kbps) to eighty thousand bit per second (80 Kbps) or higher.

An exemplary prior art RFID tag 200 is shown in FIG. 2. The RFID tag 200 comprises an analog block 210, a digital state machine block 220, and a non volatile memory (NVM) block 230. The analog block 210 comprises a demodulator circuit 215 and a modulator circuit 225. Radio frequency (RF) energy couples to the elements of the RFID tag 200 through antenna 235. On-chip direct current (DC) power is generated in RFID tag 200 using a charge pump circuit (not shown in FIG. 2). The DC power is used to power the remaining functions of the chip of RFID tag 200.

Data detection, voltage regulation, backscatter clock generation, and other functions are performed in the analog domain of analog block 210. The actual protocol functions are handled in the digital state machine block 220. EPC data or user data may be stored either in the non-volatile memory (NVM) block 230 or in a laser read only memory (ROM) unit (not shown in FIG. 2).

The functions of direct current (DC) power generation, clock signal generation, demodulation, etc. are performed using the analog circuitry in the analog block 210. The digital state machine block 220 performs an RFID communication protocol function with the RFID reader unit. The RFID communication protocol function is carried out in the digital state machine block 220.

The RFID communication protocol permits a single RFID tag to be singled out among all of the RFID tags in a system. The process of singling out a particular RFID tag is referred to as singulation. Singulation of a particular RFID tag is usually achieved by using the unique RFID tag identifier that is embedded in each RFID tag.

The RFID communication protocol regulates the sending of commands from the reader unit to the RFID tags. The RFID communication protocol allows command to be executed in specific states of the RFID tags. Commands are classified as mandatory commands, optional commands, and proprietary commands. Mandatory commands allow general and operational control of the RFID tags. Optional commands may or may not be executed by the RFID tags. Proprietary commands are designed to provide unique features and functions to be executed by the RFID tags.

RFID communication protocol commands are further classified as global commands and singulated commands. Global commands may be executed by any active RFID tag in the system. Singulated commands may be executed only by the RFID tag that is currently singulated (i.e., singled out from the other RFID tags).

As shown in FIG. 2, RFID tag 200 also comprises a data logger 240 and an on-chip sensor unit 250. A first example of an on-chip sensor unit 250 is a temperature sensor. A second example of an on-chip sensor unit 250 is a pressure sensor. The sensor unit 250 provides sensor information to the digital state machine block 220 through the data logger 240.

The data logger 240 is capable of receiving and storing sensor information from one or more on-chip sensor units 250. The on-chip sensor units 250 periodically send sensor information to the data logger 240. The data logger 240 comprises data logger registers 260 and a data logger memory 270. The data logger 240 stores information from the sensor units 250 in logger memory 270 to record a history of the sensor information that is detected by the on-chip sensor units 250. The data logger 240 is located between the digital state machine block 220 and the sensor units 250.

FIG. 3 illustrates a diagram showing an exemplary data logger memory 240. As previously mentioned, data logger 240 comprises data logger registers 260 and data logger memory 270. In one embodiment of data logger 240 the total number of memory locations in the data logger registers 260 and the data logger memory 270 is sixty four thousand bytes (64 Kbytes).

In the architecture of prior art RFID system 100 there are no specific commands in the RFID communication protocol for the RFID reader 120 to use to communicate with a data logger 240 in a prior art RFID tag. The RFID communication commands that presently exist in the RFID communication protocol are supposed to be used in a modified form to communicate with the data logger 240.

There is a need in the art for an RFID reader that is capable of communicating with a data logger in an integrated RFID tag. There is also a need in the art for an RFID reader that is capable of communicating with sensor units in an integrated RFID tag by communicating with the data logger of the integrated RFID tag.

Before undertaking the Detailed Description of the Invention below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior uses, as well as future uses, of such defined words and phrases.

BRIEF DESCRIPTION OF THE DRAWINGS

For a more complete understanding of the present invention and its advantages, reference is now made to the following description taken in conjunction with the accompanying drawings, in which like reference numerals represent like parts.

DETAILED DESCRIPTION OF THE INVENTION

FIGS. 4 through 11, discussed below, and the various embodiments used to describe the principles of the present invention in this patent document are by way of illustration only and should not be construed in any way to limit the scope of the invention. Those skilled in the art will understand that the principles of the present invention may be implemented in any type of suitably arranged radio frequency identification (RFID) device.

RFID technology and Sensor-Data Logging technology are converging. From one point of view, one can characterize the combination of the two technologies as RFID tag products that have been extended with sensors and data loggers. From another point of view, one can characterize the combination of the two technologies as sensors and data logger products that have been equipped with RFID capabilities.

In products that combine the two technologies the sensors, data loggers, and RFID circuitry are integrated in the same integrated circuit die (or at least in the same integrated circuit package). Embodiments that use more than one integrated circuit chip may also be utilized.

The RFID reader in an RFID system needs to communicate with the data loggers in the integrated RFID tags. The present invention comprises a RFID communication protocol command that is capable of communicating with a data logger in an integrated RFID tag. The RFID communication protocol command is referred to as a Communicate With Data Logger Command.

Figure 1:
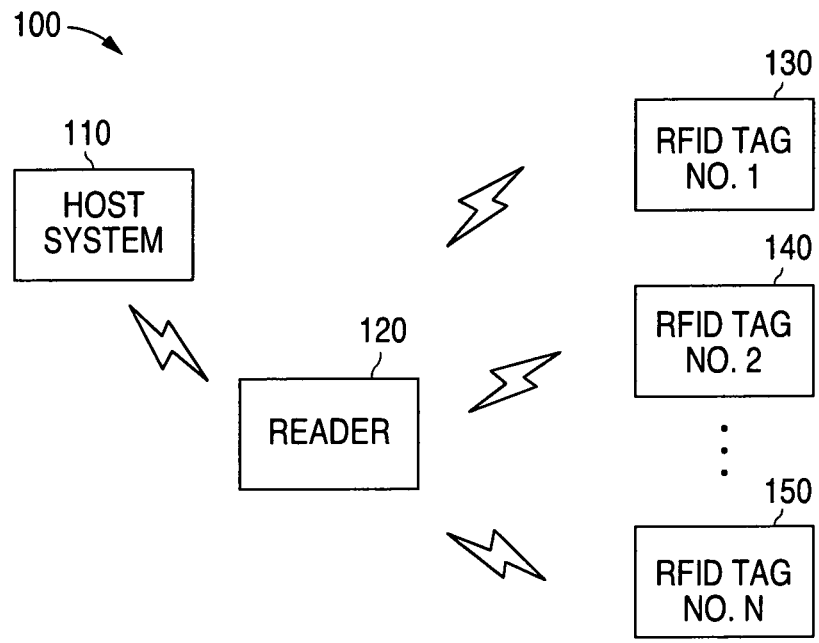
FIG. 1 illustrates a schematic block diagram of an architecture of an exemplary prior art radio frequency identification (RFID) system.
Figure 3:
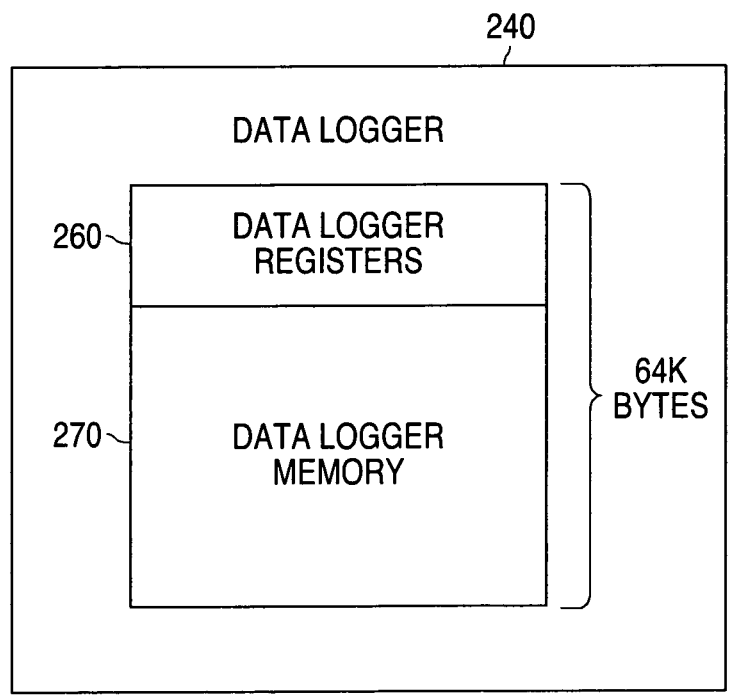
FIG. 3 illustrates a diagram showing an exemplary data logger of a prior art radio frequency identification (RFID) tag.
Figure 2:
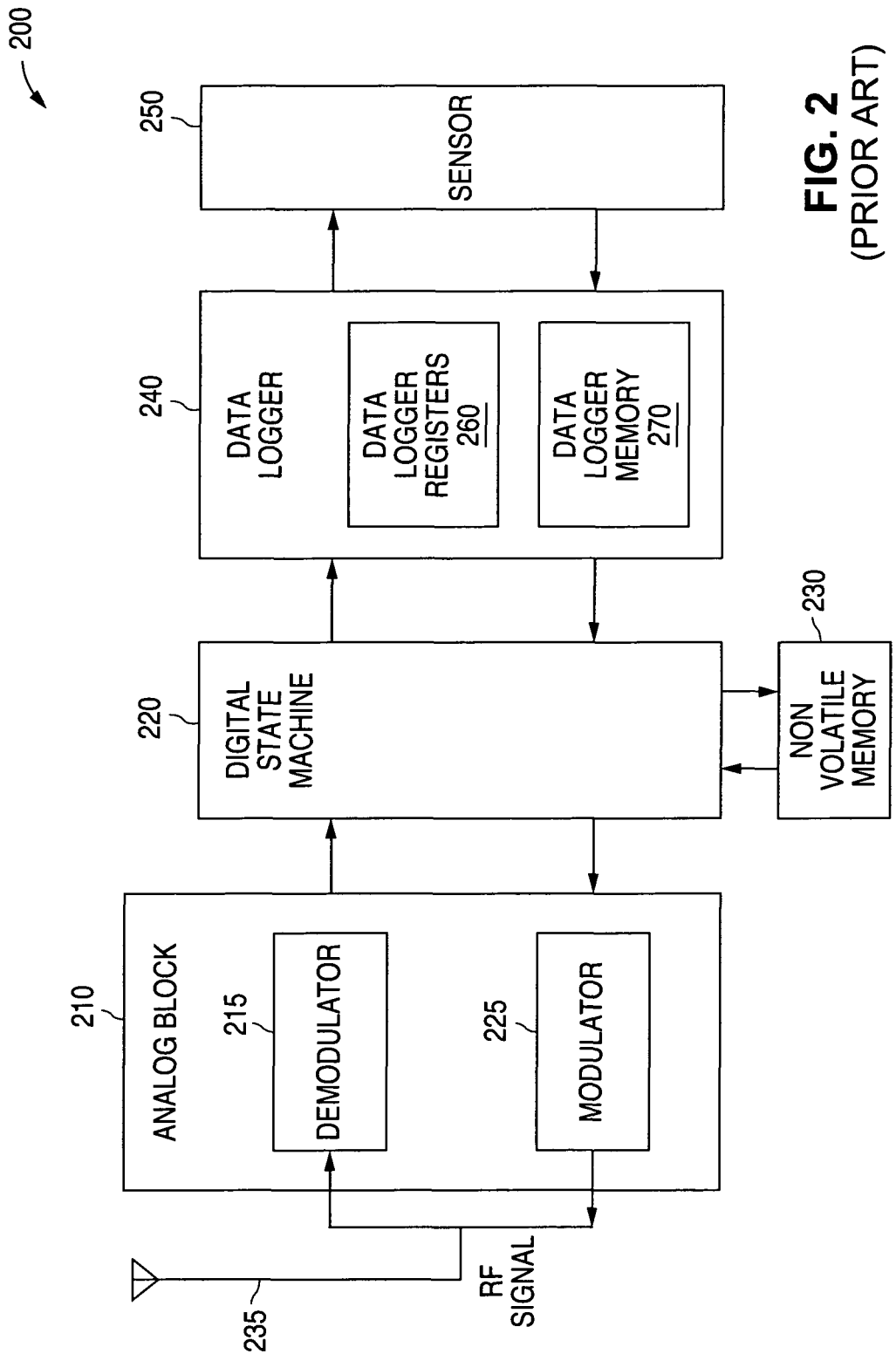
FIG. 2 illustrates a schematic block diagram of an architecture of an exemplary prior art radio frequency identification (RFID) tag.
Figure 4:
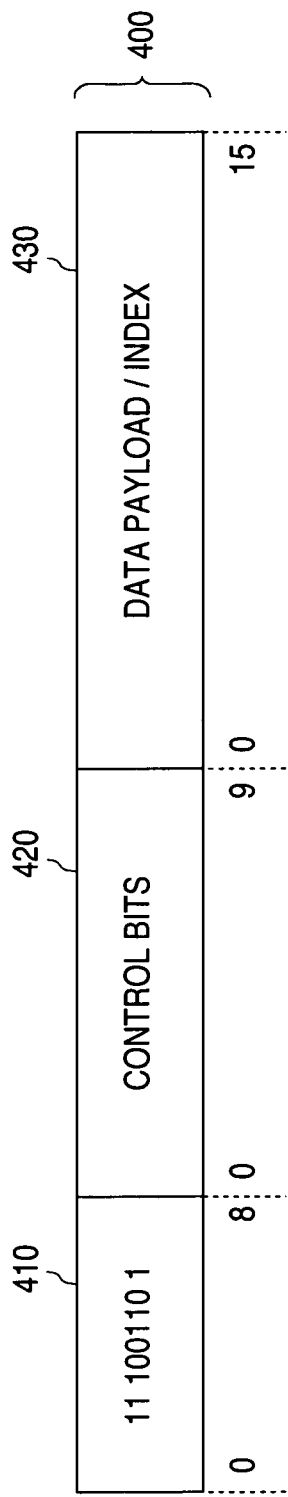
FIG. 4 illustrates a Communicate With Data Logger Command in accordance with the principles of the present invention.

FIG. 4 illustrates the structure of the Communicate With Data Logger Command 400. Communicate With Data Logger Command 400 is a global proprietary command. As will be more fully described, the Communicate With Data Logger Command 400 may also be used to communicate with the sensor units of an RFID tag. For convenience in description, the Communicate With Data Logger Command 400 will sometimes be referred to as CDL Command 400.

The first nine (9) bits of the CDL Command 400 are bits that identify the beginning of CDL Command 400. The first nine (9) bits are referred to as "start" bits. The start bits are selected (i.e., defined) to be the sequence: 11 100110 1. The start bits of the CDL Command 400 are designated with reference numeral 410.

Figure 5:
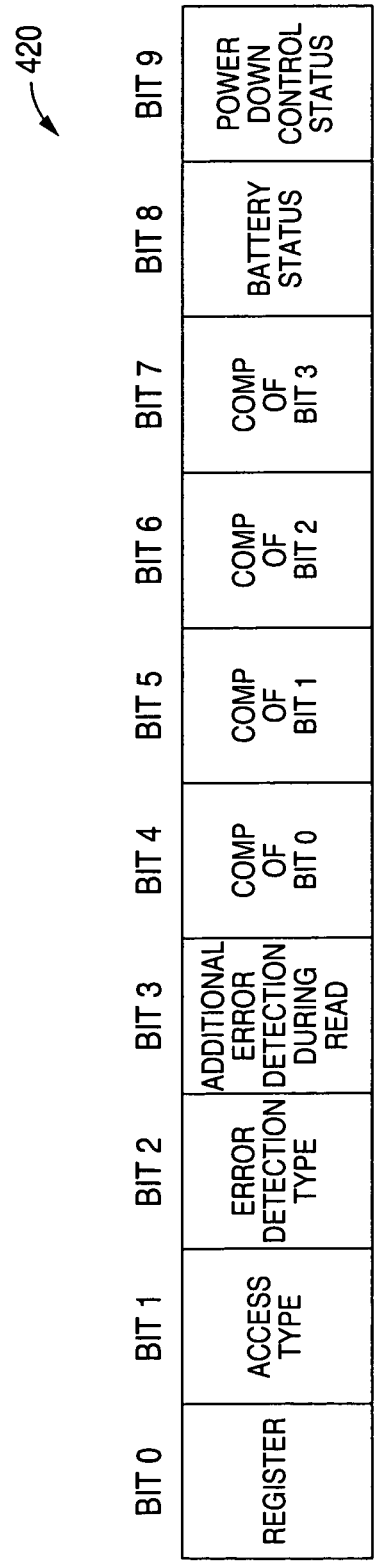
FIG. 5 illustrates a set of control bits for the Communicate With Data Logger Command shown in FIG. 4.

The next ten (10) bits of CDL Command 400 are control bits. The ten control bits are designated from Bit 0 through Bit 9. The control bits are designated with reference numeral 420. FIG. 5 illustrates the control bits 420 in more detail. The function of the control bits 420 will be described more fully later in this patent document.

The remaining bits of CDL Command 400 contain the data payload/index information for a data access. The data payload/index information bits are designated from Bit 0 through Bit 15. The data payload/index information bits are designated with reference numeral 430.

Figure 6:
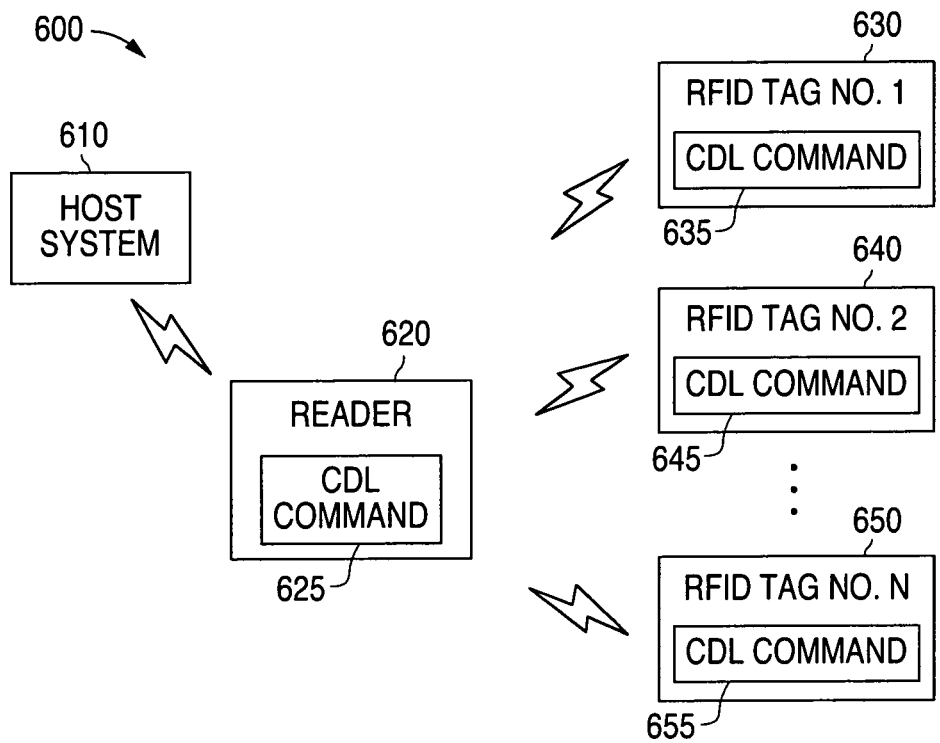
FIG. 6 illustrates an RFID system in accordance with the principles of the present invention.

FIG. 6 illustrates an RFID system 600 in accordance with the principles of the present invention. RFID system 600 generally comprises a host computer system 610 and at least one reader unit 620. The reader unit 620 may communicate with the host computer system 610 via wired or wireless communication. The reader unit 620 uses an antenna to transmit radio energy to interrogate a responder such as a radio frequency identification (RFID) tag. The RFID system 600 shown in FIG. 6 comprises a first RFID tag 630, a second RFID tag 640, and an Nth RFID tag 650.

The reader unit 620 comprises a Communicate With Data Logger Command (CDL Command) unit 625. The first RFID tag 630 comprises a Communicate With Data Logger Command (CDL Command) unit 635. The second RFID tag 640 comprises a Communicate With Data Logger Command (CDL Command) unit 645. The Nth RFID tag 650 comprises a Communicate With Data Logger Command (CDL Command) unit 655. The reader unit 620 is capable of communicating with each of the RFID tags using the CDL Command 400 in a manner that will be more fully described below.

Figure 7:
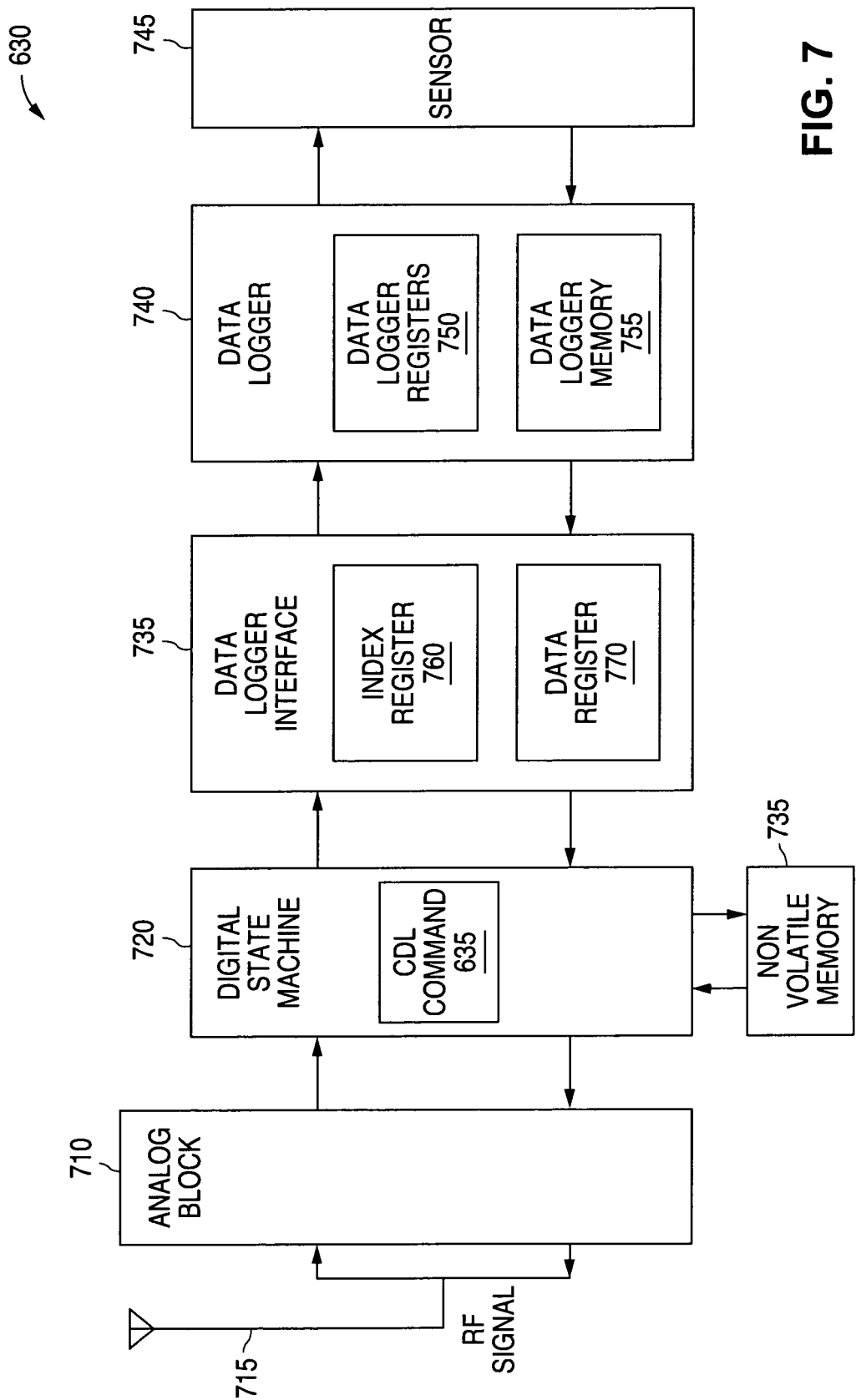
FIG. 7 illustrates a schematic block diagram of an architecture of a radio frequency identification (RFID) tag in accordance with the principles of the present invention.

FIG. 7 illustrates a schematic block diagram of an architecture of the first RFID tag 630 in accordance with the principles of the present invention. As shown in FIG. 7, the RFID tag 630 comprises an analog block 710, a digital state machine block 720, and a non volatile memory (NVM) block 725. The analog block 710 comprises a demodulator circuit (not shown in FIG. 7) and a modulator circuit (not shown in FIG. 7). Radio frequency (RF) energy couples to the elements of the RFID tag 630 through antenna 715. On-chip direct current (DC) power is generated in RFID tag 630 using a charge pump circuit (not shown in FIG. 7). The DC power is used to power the remaining functions of the chip of RFID tag 630.

The functions of direct current (DC) power generation, clock signal generation, demodulation, etc. are performed using the analog circuitry in the analog block 710. The digital state machine block 720 performs an RFID communication protocol function with the RFID reader 620. The RFID communication protocol function is carried out in digital state machine block 720. The digital state machine block 720 also comprises the Communicate With Data Logger Command (CDL Command) unit 635. The reader unit 620 is capable of communicating with RFID tag 630 using the CDL Command 400 and the CDL Command unit 635.

RFID tag 630 also comprises data logger interface 735, data logger 740, and on-chip sensor unit 745. The sensor unit 745 provides sensor information to the digital state machine block 720 through data logger 740 and data logger interface 735. Data logger 740 comprises data logger registers 750 and data logger memory 755.

The data logger 740 of RFID tag 630 is capable of receiving and storing sensor information from one or more on-chip sensor units 745. The on-chip sensor units 745 periodically send sensor information to data logger 740. Data logger 740 stores the sensor information in data logger memory 755 to record a history of the sensor information that is detected by the on-chip sensor units 745.

Figure 8:
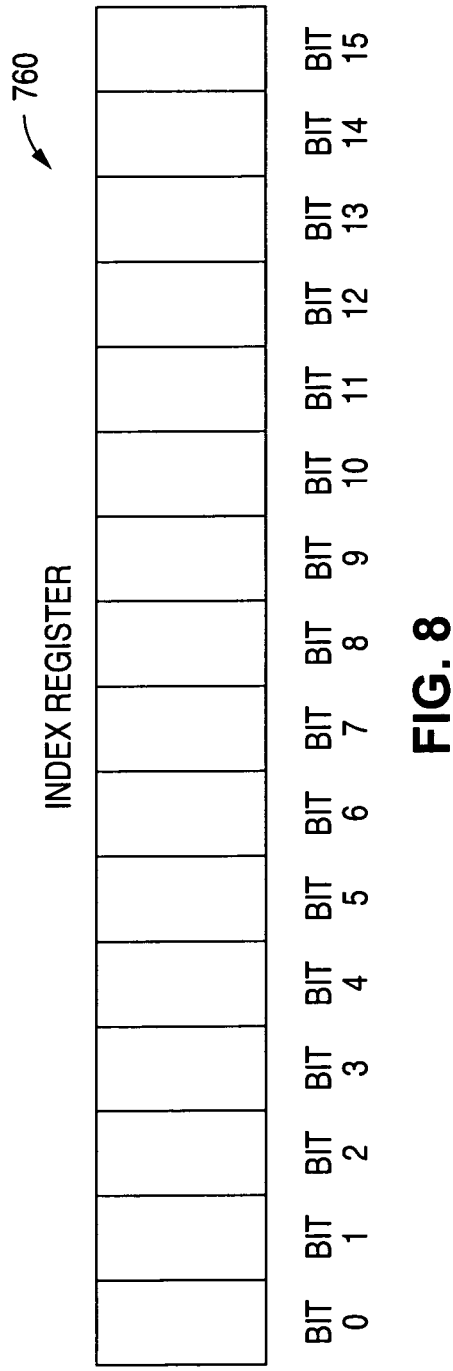
FIG. 8 illustrates an Index Register in accordance with the principles of the present invention.
Figure 9:
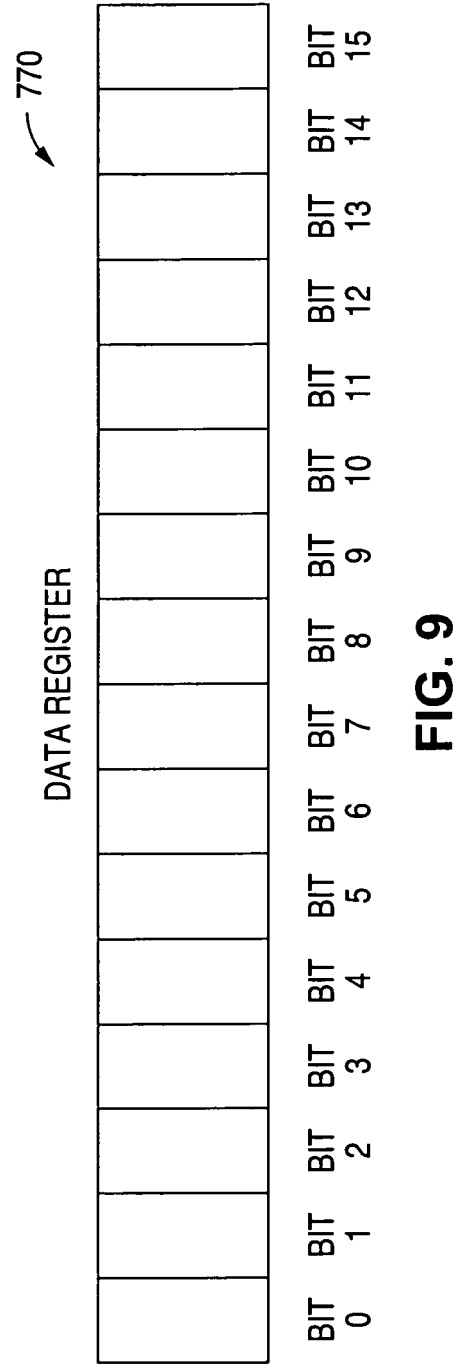
FIG. 9 illustrates an Data Register in accordance with the principles of the present invention.

Data logger interface 735 comprises an Index Register 760 and a Data Register 770. The present invention uses the Index Register 760 and the Data Register 770 to address the programmable data logger registers 750 and the data logger memory locations 755 of the data logger 740. The Index Register 760 is illustrated in FIG. 7 and the Data Register 770 is illustrated in FIG. 8.

The Index Register 760 and the Data Register 770 can access any programmable register or memory location in the sixty-four (64) Kilobyte space in the data logger 740. To access a location, the address of the location is specified in the sixteen (16) bits of the Index Register 760 and then an access (i.e., read or write) is made to the Data Register 770.

For example, to read a byte at a specific memory location 0x1234, one first "writes" the Index Register 760 with the location 0x1234. Then a command is sent to read the data in the memory location into Data Register 770. To write a byte at memory location 0x1234, one first "writes" the Index Register 760 with the location 0x1234. Then a command is sent to write the data in the Data Register 760 into the memory location 0x1234.

Figure 10:
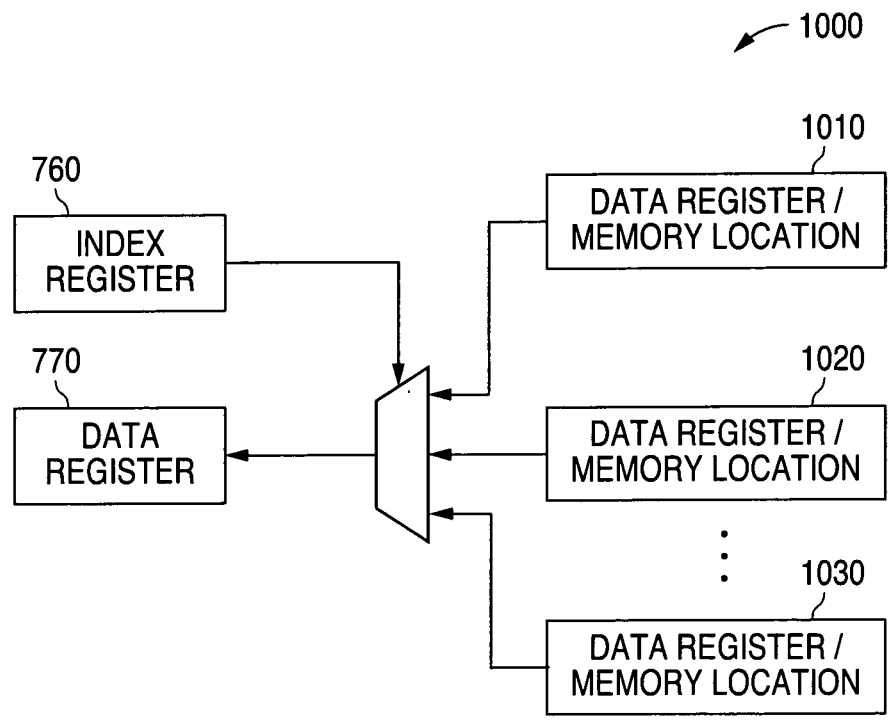
FIG. 10 illustrates a schematic diagram showing the operation of the Index Register and the Data Register of the present invention.

FIG. 10 illustrates a schematic diagram 1000 showing one advantageous embodiment of the operation of the Index Register 760 and the Data Register 770 of the present invention. The Index Register 760 selects data from one of a plurality of data registers/memory locations (1010, 1020, 1030). Data may be read into the Data Register 770 from the data register/memory location to which Index Register 760 is pointing. Data may also be written from the Data Register 770 into a data register/memory location to which Index Register 760 is pointing.

In one advantageous embodiment of the invention, the Data Register 770 may be a "fictitious" data register. Data accesses to a "fictitious" data register are actually forwarded to the data register/memory location to which the Index Register 760 is pointing. In another advantageous embodiment of the invention, the Data Register 770 is a physical data register.

At first sight, the use of Index Register 760 and Data Register 770 appears to present additional overhead because a data access to any arbitrary address data register/memory location must be preceded by a "write" to the Index Register 760. However, the additional overhead is mitigated for sequential accesses. The operation of the register pair (Index Register 760 and Data Register 770) is very efficient during sequential access.

If one were to read a series of bytes starting at a specific memory location, then the write command for the Index Register 760 needs to be specified only once (at the beginning of the process) and not for each individual access. The address data in the Index Register 760 is automatically updated to point at the next sequential address.

The updated value in the Index Register 760 is also available for reading. This feature is very useful when there is an error or premature break in a long, sequential access running into hundreds of bytes. One can just read the contents of the Index Register 760 (which contains the most recent value) and restart at that point. One does not have to restart at the beginning.

The operation of the Index Register 760 and the Data Register 770 also helps in hiding the latency associated with the Data Read access from the data logger 740. Because the Index Register 760 has to be written before the Data Register 770 access, one can schedule a speculative pre-fetch and hide the latency. In this manner, the data logger 740 can operate at a far lower clock frequency (which translates into lower power consumption) than would otherwise be necessary.

A description of the control bits 420 of the Communicate With Data Logger Command 400 will now be given. The control bits 420 comprise ten (10) bits as follows. Bit 0 is a Register bit that specifies the register to be accessed. If Bit 0 is a zero ("0") then the Index Register 760 is to be accessed. If Bit 0 is a one ("1") then the Data Register 770 is to be accessed.

Bit 1 is an Access Type bit. If Bit 1 is a zero ("0") then the access type is a "read" access. If Bit 1 is a one ("1") then the access type is a "write" access.

Bit 2 is an Error Detection Type bit. Bit 2 specifies the error detection type for a Data Read access. If Bit 2 is zero ("0") then the error detection type is "odd parity after every byte." If Bit 2 is one ("1") then the error detection type is "sixteen (16) bit CRC (cyclic redundancy check) after every sixteen (16) byte."

Bit 3 specifies whether additional error detection is used during a Data Read access. If Bit 3 is zero ("0") then there is no bit-by-bit exchange. The RFID reader 620 sends dummy bits during the Data Read access. If Bit 3 is one ("1") then bit-by-bit exchange is enabled. The RFID reader 620 is required to issue the bit it just received through backscatter as the incident bit. The RFID tag 630 checks for this protocol and suspends execution of the CDL Command 400 is there is an error. In this manner the RFID reader 620 and the RFID tag 630 are in step with each other throughout the transfer.

Bit 4 is a complement of Bit 0.
Bit 5 is a complement of Bit 1.
Bit 6 is a complement of Bit 2.
Bit 7 is a complement of Bit 3.

Bit 8 is a Battery Status bit. If Bit 8 is a zero ("0") then the battery status is acceptable. If Bit 8 is a one ("1") then the battery is in a Battery Low condition.

Bit 9 is a Power Down Control Status bit. Bit 9 signifies the status of power-down control for the clock oscillator in the data logger 740. If Bit 9 is a zero ("0") then the clock oscillator is powered down. If Bit 9 is a one ("1") then the clock oscillator is not powered down.

If Bit 9 is a zero ("0") (and the clock oscillator is powered down) then the subsequent execution of the CDL Command 400 is suspended. This is because no transactions can be launched in the data logger 740 in the absence of the clock function. The RFID reader 620 is expected to issue a command to first power up the clock oscillator. After waiting a sufficient amount of time for the clock oscillator to power up, only then does the RFID reader 620 issue the CDL Command 400.

The data accesses to the data logger 740 that are made through the Index Register 760 and the Data Register 770 are controlled through the settings of Bit 0, Bit 1 and Bit 2 in the CDL Command 400. There are five types of data accesses. They are (1) Index Read Access (2) Index Write Access (3) Data Write Access (4) Data Read Access with Parity, and (5) Data Read Access with CRC (cyclic redundancy check). The two Data Read Access can also be with or without bit-by-bit exchange. When the bit-by-bit exchange is enabled, it provides an additional level of error detection and synchronization between the RFID reader 620 and RFID tag 630.

In the case of the Write accesses, the data originates in RFID reader 620. The RFID reader 620 also gets the backscatter bit from the RFID tag 630 for very bit that the RFID tag 630 receives. In this manner, the RFID reader 620 can keep track of errors in communication. Parity after every byte is expected to provide a sufficient additional level of error detection at the RFID tag 630. In addition, after a Write access is complete, the RFID reader 620 can check whether the written data is correct by making a subsequent Read access, if required.

However, in the case of the Read accesses, the data originates in the RFID tag 630. Therefore an error detection process in the form of a cyclic redundancy check (CRC) is very desirable, especially for large transfers. This is the reason why only the Data Read Access has the CRC option.

In the bit-by-bit exchange, after the first bit of the Data Payload/Index 430, the RFID reader 620 is required to issue the bit it just received through backscatter during the last data period, as the incident bit for the present data period. RFID tag 730 checks for this protocol and suspends execution of the CDL Command 400 if there is an error. In this manner the RFID reader 620 and the RFID tag 630 keep in step with each other throughout the transfer. This approach has the disadvantage of exposing data (possible sensitive data) throughout the transmission from the RFID reader 620.

When enabled, the cyclic redundancy check (CRC) will be used in lieu of parity. The CRC that is used is sixteen (16) bit CRC. The CRC is interpolated with the Data Payload/Index 430 after every sixteen (16) bytes.

The access to Index Register 760 involves a fixed payload of sixteen (16) bytes. Error detection for access to Index Register 760 (whether read or write) is always only through Parity (per byte). The CRC option and the bit-by-bit exchange option are not available for the accesses to Index Register 760.

The Parity that is used in "odd" parity. That is, for a data byte of zero zero hexadecimal ("00 Hex"), the parity is one ("1").

Within each byte, data is always transmitted with the most significant bit first. For access to the Index Register 760 (which involves two eight (8) bit bytes) the most significant byte is sent first.

Index Read Access. In the case of the Index Read Access, Bit 0 is set to zero ("0") and Bit 1 is set to zero ("0") in the Communicate With Data Logger Command 400. When the RFID tag 630 receives the Index Read Access command the RFID tag 630 returns Bits 15 through 8 of the Index Register 760 (with odd parity) and Bits 7 though 0 of the Index Register 760 (with odd parity on the incident bits through backscatter).

Error Detection for Index Read Access. Parity provides error detection for each byte. The RFID reader 620 computes odd parity for each byte and compares it against the parity sent by the RFID tag 630. In addition, instead of sending dummy incident bits, the communication protocol between the RFID reader 620 and the RFID tag 630 is chosen to help bit wise synchronization. That is, after the first bit, the RFID reader 620 is required to issue the bit it just received through backscatter as the incident bit. The RFID tag 630 checks for this protocol and suspends execution of the CDL Command 400 if an error is detected. In this way the RFID reader 620 and the RFID tag 630 are in step with each other throughout the transfer.

Index Write Access. In the case of the Index Write Access, Bit 0 is set to zero ("0") and Bit 1 is set to one ("1") in the Communicate With Data Logger Command 400. When the RFID tag 630 receives the Index Write Access command the RFID tag 630 writes the incident bits sent by the RFID reader 620 into the Index Register 760. Bits 15 through 8 of the Index Register 760 (with odd parity) are written and Bits 7 though 0 of the Index Register 760 (with odd parity from the incident bits sent by RFID reader 620) are written.

Error Detection for Index Write Access. Parity for each byte is checked separately and if the parity does not match, then the RFID tag 630 suspends execution of the CDL Command 400. While the execution of CDL Command 400 is in progress (that is, not suspended due to error), the RFID tag 630 returns the incident bit through backscatter and this can be checked by RFID reader 620.

Data Write Access. In the case of the Data Write Access, Bit 0 is set to one ("1") and Bit 1 is set to one ("1") in the Communicate With Data Logger Command 400. When the RFID tag 630 receives the Data Write Access command the RFID tag 630 captures Bit 7 though Bit 0 of the Data Register 770 and odd parity during the first eight (8) bits issued by the RFID reader 620.

If the parity is correct, then the data logger register/memory location that is pointed to by the Index Register 760 is updated with the byte that has just been received. The Index Register 760 is then automatically incremented. If the RFID reader 620 were to issue subsequent bits, the RFID tag 630 would capture the next eight (8) bits (plus parity bit) as though they were meant for the location pointed to by the updated Index Register 760 and the process continues. The sequential access process can be continued indefinitely up to the end of the address space limit.

Error Detection for Data Write Access. If the parity does not match, then the RFID tag 630 suspends the execution of the CDL Command 400. While the execution of the CDL Command 400 is in progress (that is, not suspended due to error), the RFID tag 630 always returns the incident bit through backscatter and this has to be checked by the RFID reader 620.

Data Read Access with Parity and Bit-by-bit Exchange Enabled/Disabled. In this type of Data Read Access, Bit 0 is set to one ("1") and Bit 1 is set to zero ("0") and Bit 2 is set to zero ("0") and Bit 3 is set to zero ("0") (for bit-by-bit exchange disabled) or Bit 3 is set to one ("1") (for bit-by-bit exchange enabled) in the Communicate With Data Logger Command 400. When the RFID tag 630 receives this type of Data Read Access command the RFID tag 630 returns Bit 7 though Bit 0 of the Data Register 770 (with odd parity for the first eight (8) bits issued by the RFID reader 620). The Index Register 760 is automatically incremented. If the RFID reader 620 were to issue subsequent bits, the RFID tag 630 would return Bit 7 through Bit 0 of the Data Register 770 (with odd parity pointed to by the updated Index Register 760). The sequential access process can be continued indefinitely up to the end of the address space limit.

Error Detection for Data Read Access with Parity and Bit-by-bit Exchange Enabled/Disabled. Parity provides error detection for each byte. In addition, instead of sending dummy incident bits, the protocol of data exchange between the RFID reader 620 and the RFID tag 630 is chosen to help bit wise synchronization. That is, after the first bit, the RFID reader 620 is required to issue the bit it just received through backscatter as the incident bit. The RFID tag 630 checks for this protocol and suspends execution of the CDL Command 400 if an error is detected. In this way the RFID reader 620 and the RFID tag 630 are in step with each other throughout the transfer.

Data Read Access with CRC and Bit-by-bit Exchange Enabled/Disabled. In this type of Data Read Access, Bit 0 is set to one ("1") and Bit 1 is set to zero ("0") and Bit 2 is set to one ("1") and Bit 3 is set to zero ("0") (for bit-by-bit exchange disabled) or Bit 3 is set to one ("1") (for bit-by-bit exchange enabled) in the Communicate With Data Logger Command 400. When the RFID tag 630 receives this type of Data Read Access command the RFID tag 630 returns Bit 7 though Bit 0 of the Data Register 770 for the first seven (7) bits issued by the RFID reader 620. The Index Register 760 is automatically incremented. If the RFID reader 620 were to issue subsequent bits, the RFID tag 630 would return the Bit 7 through Bit 0 of the Data Register 770 pointed to by the updated Index Register 760. The sequential access process can be continued indefinitely up to the end of the address space limit. In addition, for every group of sixteen (16) byte reads, a sixteen (16) bit cyclic redundancy check (CRC) is interpolated. The CRC computation includes the CRC bits.

Error Detection for Data Read Access with CRC and Bit-by-bit Exchange Enabled/Disabled. Cyclic redundancy check (CRC) provides error detection for every group of sixteen (16) bytes. In addition, instead of sending dummy incident bits, the RFID communications protocol between the RFID reader 620 and the RFIF Tag 630 is chosen to help bit wise synchronization. That is, after the first bit, and including the CRC bits, the RFID reader 620 is required to issue the bit it just received through backscatter as the incident bit. The RFID tag 630 checks for this protocol and suspends execution of the CDL Command 400 if an error is detected. In this way the RFID reader 620 and the RFID tag 630 are in step with each other throughout the transfer.

Figure 11:
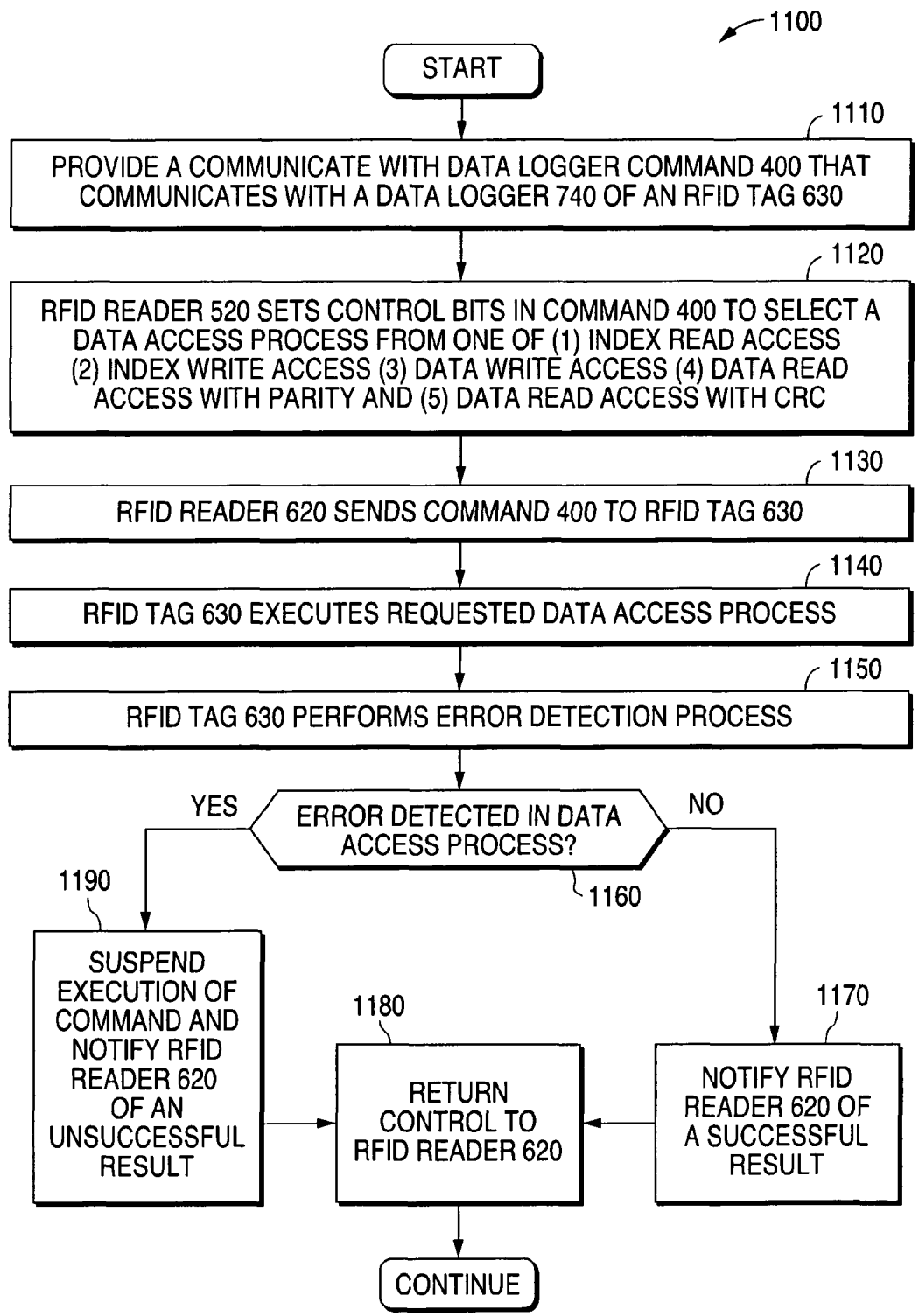
FIG. 11 illustrates a flow chart showing the steps of an advantageous embodiment of the method of the present invention.

FIG. 11 illustrates a flow chart 1100 showing the steps of an advantageous embodiment of the method of the present invention. A command (Communicate With Data Logger Command 400) is provided that is capable of communicating with a data logger 740 of an RFID tag 630 in an RFID system 600 (step 1110). The RFID reader 620 of the RFID system 600 sets control bits in the Communicate With Data Logger Command 400 to select a data access process from one of: (1) Index Read Access (2) Index Write Access (3) Data Write Access (4) Data Read Access with Parity and (5) Data Read Access with CRC (step 1120).

Then the RFID reader 620 sends the Communicate With Data Logger Command 400 to an RFID tag 630 (step 1130). Then the RFID tag 630 executes the requested data access process (step 1140). Then the RFID tag 630 performs an error detection process (step 1150).

The RFIF Tag 630 then determines whether an error has been detected in the data access process (decision step 1160). If no error has been detected, the RFID tag 630 notifies the RFID reader 620 of a successful result (step 1170) and control of the process returns to RFID reader 620 (step 1180).

If the RFID tag 630 determines that an error has been detected, then the RFID tag 630 suspends execution of the Communicate With Data Logger Command 400 and notifies the RFID reader 620 of an unsuccessful result (step 1190). Control of the process then returns to RFID reader 620 (step 1180).

The Communicate With Data Logger Command 400 of the present invention is a global proprietary command that is capable of communicating with a data logger 740 of an RFID tag 630. The Communicate With Data Logger Command 400 uses an RFID communications protocol to communicate with data logger 740 (and sensor unit 745) through the transfer of data to and from data logger interface 735. The Communicate With Data Logger Command 400 of the present invention also provides control and configuration instructions to data logger 740 (and to sensor unit 745) through Index Register 760 and Data Register 770.

The Communicate With Data Logger Command 400 of the present invention also comprises a built-in error detection scheme based on the RFID communications protocol. The Communicate With Data Logger Command 400 of the present invention also allows a RFID reader 620 to dynamically choose to employ additional error detection schemes (Parity or CRC) during a Data Read Access process.

The Communicate With Data Logger Command 400 of the present invention is a single command under the Class 0+ RFID tag protocol that allows data transfer to and from an on-chip data logger 740. The Communicate With Data Logger Command 400 allows the efficient transfer of both small and large bursts of data. The Communicate With Data Logger Command 400 uses a pair of registers (Index Register 760 and Data Register 770) to access data logger registers 750 and data logger memory locations 755 in data logger 740.

The system and method of the present invention helps in hiding the latency associated with Read Data Access procedures. The system and method of the present invention also allows the transfer of any amount of data from one (1) byte to the memory limit. The system and method of the present invention also provides easy error detection and error recovery procedures.

The foregoing has outlined rather broadly the features and technical advantages of the present invention so that those skilled in the art may understand the invention. Those skilled in the art should appreciate that they may readily use the conception and the specific embodiment disclosed as a basis for modifying or designing other structures for carrying out the same purposes of the present invention. Those skilled in the art should also realize that such equivalent constructions do not depart from the spirit and scope of the invention in its broadest form.

Although the present invention has been described with an exemplary embodiment, various changes and modifications may be suggested to one skilled in the art. It is intended that the present invention encompass such changes and modifications as fall within the scope of the appended claims.

What is claimed is:

1. A radio frequency identification (RFID) system that comprises:
    an RFID tag that comprises a data logger; and
    an RFID reader configured to communicate with said data logger of said RFID tag using a Communicate With Data Logger Command comprising a plurality of control bits, wherein the plurality of control bits comprises:
        a Register bit that toggles a register to be accessed between an Index Register and a Data Register, wherein the Index Register specifies a memory location in said data logger;
        an Access Type bit that toggles an access type between read access and write access; and
        an Error Detection Type bit that identifies a type of error detection to be used with the read access.

2. The RFID system as set forth in claim 1:
    wherein said RFID tag further comprises a data logger interface comprising the Index Register and the Data Register; and
    wherein said RFID reader is configured to communicate with said data logger of said RFID tag through said data logger interface.

3. The RFID system as set forth in claim 2:
    wherein said RFID tag further comprises a sensor unit; and
    wherein said RFID reader is configured to communicate with said sensor unit of said RFID tag through said data logger.

4. The RFID system as set forth in claim 1 wherein said plurality of control bits further comprises:
    an Additional Error Detection During Read bit that identifies whether bit-by-bit exchange is enabled; and
    a plurality of complement bits that complement the Register bit, the Access Type bit, and the Error Detection Type bit.

5. The RFID system as set forth in claim 1 wherein said Communicate With Data Logger Command.

6. The RFID system as set forth in claim 5 wherein said Communicate With Data Logger Command accesses said memory location in said data logger by specifying an address of said memory location in the Index Register of said RFID tag and by performing a data access in said memory location in the Data Register of said RFID tag.

7. The RFID system as set forth in claim 6 wherein said data access performed by said Communicate With Data Logger Command comprises one of: an Index Read access, an Index Write access, a Data Write access, a Data Read access with parity, and a Data Read access with cyclic redundancy check (CRC).

8. The RFID system as set forth in claim 6 wherein said Communicate With Data Logger Command performs an error detection process after accessing the memory location in said data logger.

9. The RFID system as set forth in claim 6 wherein said Communicate With Data Logger Command suspends memory access functions when a clock oscillator associated with said data logger is powered down.

10. The RFID system as set forth in claim 1, wherein the Register bit, the Access Type bit, and the Error Detection Type bit are arranged consecutively in the Communicate With Data Logger Command.

11. For use in a radio frequency identification (RFID) system, an apparatus configured to communicate with an RFID tag comprising a data logger, the apparatus comprising:
    an RFID reader comprising a Communicate With Data Logger Command unit configured to communicate with said data logger of said RFID tag;
    wherein the Communicate With Data Logger Command unit of the RFID reader is configured to transmit a Communicate With Data Logger Command comprising a plurality of control bits, wherein the plurality of control bits comprises:
        a Register bit that toggles a register to be accessed between an Index Register and a Data Register, wherein the Index Register specifies a memory location in said data logger;
        an Access Type bit that toggles an access type between read access and write access; and
        an Error Detection Type bit that identifies a type of error detection to be used with the read access.

12. The apparatus as set forth in claim 11:
    wherein said RFID tag further comprises a data logger interface comprising an Index Register and a Data Register; and
    wherein said RFID reader is configured to communicate with said data logger of said RFID tag through said data logger interface.

13. The apparatus as set forth in claim 12:
    wherein said RFID tag further comprises a sensor unit; and
    wherein said RFID reader is configured to communicate with said sensor unit of said RFID tag through said data logger.

14. The apparatus as set forth in claim 12:
    wherein the Communicate With Data Logger Command specifies an address of said memory location in said Index Register of said RFID tag.

15. The apparatus as set forth in claim 14 wherein said data access performed by said Communicate With Data Logger Command comprises one of: an Index Read access, an Index Write access, a Data Write access, a Data Read access with parity, and a Data Read access with cyclic redundancy check (CRC).

16. A method of operating a radio frequency identification (RFID) system, said method comprising the steps of:
    transmitting a Communicate With Data Logger Command from an RFID reader to an RFID tag, wherein the RFID tag comprises a data logger, and wherein the RFID reader comprises a Communicate With Data Logger Command unit configured to communicate with said data logger of said RFID tag;
    wherein the Communicate With Data Logger Command unit of the RFID reader transmits the Communicate With Data Logger Command to the RFID tag; and
    wherein the Communicate With Data Logger Command comprises a plurality of control bits, and the plurality of control bits comprises:
        a Register bit that toggles a register to be accessed between an Index Register and a Data Register, wherein the Index Register specifies a memory location in said data logger;
        an Access Type bit that toggles an access type between read access and write access; and an Error Detection Type bit that identifies a type of error detection to be used with the read access.

17. The method as set forth in claim 16 further comprising the step of:
accessing a memory location in said data logger using the Communicate With Data Logger Command.

18. The method as set forth in claim 17 wherein said Communicate With Data Logger Command accesses said memory location in said data logger by specifying an address of said memory location in the Index Register of said RFID tag and by performing a data access in said memory location in the Data Register of said RFID tag.

19. The method as set forth in claim 18 wherein said data access performed by said Communicate With Data Logger Command comprises one of: an Index Read access, an Index Write access, a Data Write access, a Data Read access with parity, and a Data Read access with cyclic redundancy check (CRC).

20. The method as set forth in claim 18 further comprising the step of:
performing an error detection process after said Communicate With Data Logger Command accesses the memory location in said data logger.

21. The method as set forth in claim 17 further comprising the step of:
suspending memory access functions of said Communicate With Data Logger Command when a clock oscillator associated with said data logger is powered down.

* * * * *